(12) United States Patent
Hirai

(10) Patent No.: US 11,037,327 B2
(45) Date of Patent: Jun. 15, 2021

(54) CAMERA CONTROL METHOD, CAMERA CONTROL DEVICE, AND NON-TRANSITORY COMPUTER-READABLE STORAGE MEDIUM

(71) Applicant: FUJITSU LIMITED, Kawasaki (JP)

(72) Inventor: Yukio Hirai, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 210 days.

(21) Appl. No.: 16/135,074

(22) Filed: Sep. 19, 2018

(65) Prior Publication Data

US 2019/0096090 A1    Mar. 28, 2019

(30) Foreign Application Priority Data

Sep. 22, 2017 (JP) .............................. JP2017-181987

(51) Int. Cl.
*G06T 7/80* (2017.01)
*G06K 9/62* (2006.01)
(Continued)

(52) U.S. Cl.
CPC .............. *G06T 7/80* (2017.01); *G06K 9/6211* (2013.01); *G06T 3/0018* (2013.01);
(Continued)

(58) Field of Classification Search
CPC ..................... G06T 7/80; G06T 3/0018; G06T 2207/30204; H04N 5/247; H04N 5/23227;
(Continued)

(56) References Cited

U.S. PATENT DOCUMENTS 10,269,140 B2 *  4/2019  Dubout ................ G06K 9/6211
2014/0132709 A1  5/2014  Satoh et al.
(Continued)

FOREIGN PATENT DOCUMENTS

| JP | 2001-256492 | 9/2001 |
| JP | 2011-101265 | 5/2011 |
| JP | 2013-25255 | 2/2013 |

OTHER PUBLICATIONS

Davide Scaramuzza et al., "A Flexible Technique for Accurate Omnidirectional Camera Calibration and Structure from Motion", ICVS 2006, IEEE, 2006 (8 pages).
(Continued)

*Primary Examiner* — Daniel G Mariam
(74) *Attorney, Agent, or Firm* — Fujitsu Patent Center

(57) ABSTRACT

A camera control method including performing first detection processing that detects a plurality of predetermined patterns at different positions in real space from one or more images captured by a first camera, acquiring camera characteristic information on the first camera based on one or more first predetermined patterns, included in the plurality of predetermined patterns, successfully detected in the first detection processing, correcting the one or plurality of images based on the acquired camera characteristic information, performing second detection processing to detect one or more second predetermined patterns, included in the plurality of predetermined patterns, that failed to be detected in the first detection processing, the one or more second predetermined patterns being included in the one or more images on which the correcting has been performed, and updating the camera characteristic information based on the detected one or more second predetermined patterns.

14 Claims, 16 Drawing Sheets

(51) Int. Cl.
    *H04N 5/247* (2006.01)
    *G06T 3/00* (2006.01)
    *H04N 5/232* (2006.01)
    *H04N 17/00* (2006.01)
(52) U.S. Cl.
    CPC ..... *H04N 5/23227* (2018.08); *H04N 5/23238* (2013.01); *H04N 5/247* (2013.01); *H04N 17/004* (2013.01); *G06T 2207/30204* (2013.01)
(58) Field of Classification Search
    CPC . H04N 5/23238; H04N 17/004; G06K 9/6211
    USPC .................................................. 382/209, 255
    See application file for complete search history.

(56) References Cited

U.S. PATENT DOCUMENTS

2015/0192762 A1    7/2015  Satoh et al.
2016/0234429 A1*   8/2016  Cho ..................... G06T 1/0014

OTHER PUBLICATIONS

Zhengyou Zhang, "A Flexible New Technique for Camera Calibration", Microsoft Research, MSR-TR-98-71, pp. 1-21, 1998 (22 pages).

\* cited by examiner

FIG. 5

| PHOTOGRAPHIC TIME (1221) | IMAGE ID (CAMERA 2-1) (1222) | RESULTANT INFORMATION (CAMERA 2-1) (1223) | IMAGE ID (CAMERA 2-2) (1224) | RESULTANT INFORMATION (CAMERA 2-2) (1225) | REAL SPACE POSITION (1226) |
|---|---|---|---|---|---|
| T1 | 1-0001 | UNPROCESSED | 2-0001 | UNPROCESSED | (x1,y1,z1) |
| T2 | 1-0002 | UNPROCESSED | 2-0002 | UNPROCESSED | (x2,y2,z2) |
| T3 | 1-0003 | UNPROCESSED | 2-0003 | UNPROCESSED | (x3,y3,z3) |
| T4 | 1-0004 | UNPROCESSED | 2-0004 | UNPROCESSED | (x4,y4,z4) |
| T5 | 1-0005 | UNPROCESSED | 2-0005 | UNPROCESSED | (x5,y5,z5) |
| T6 | 1-0006 | UNPROCESSED | 2-0006 | UNPROCESSED | (x6,y6,z6) |
| T7 | 1-0007 | UNPROCESSED | 2-0007 | UNPROCESSED | (x7,y7,z7) |
| T8 | 1-0008 | UNPROCESSED | 2-0008 | UNPROCESSED | (x8,y8,z8) |
| T9 | 1-0009 | UNPROCESSED | 2-0009 | UNPROCESSED | (x9,y9,z9) |
| T10 | 1-0010 | UNPROCESSED | 2-0010 | UNPROCESSED | (x10,y10,z10) |

FIG. 6

| PHOTOGRAPHIC TIME (1221) | IMAGE ID (CAMERA 2-1) (1222) | RESULTANT INFORMATION (CAMERA 2-1) (1223) | IMAGE ID (CAMERA 2-2) (1224) | RESULTANT INFORMATION (CAMERA 2-2) (1225) | REAL SPACE POSITION (1226) |
|---|---|---|---|---|---|
| T1 | 1-0001 | SUCCESSFUL | 2-0001 | FAILED | (x1,y1,z1) |
| T2 | 1-0002 | FAILED | 2-0002 | FAILED | (x2,y2,z2) |
| T3 | 1-0003 | FAILED | 2-0003 | SUCCESSFUL | (x3,y3,z3) |
| T4 | 1-0004 | FAILED | 2-0004 | FAILED | (x4,y4,z4) |
| T5 | 1-0005 | SUCCESSFUL | 2-0005 | FAILED | (x5,y5,z5) |
| T6 | 1-0006 | FAILED | 2-0006 | SUCCESSFUL | (x6,y6,z6) |
| T7 | 1-0007 | FAILED | 2-0007 | FAILED | (x7,y7,z7) |
| T8 | 1-0008 | SUCCESSFUL | 2-0008 | FAILED | (x8,y8,z8) |
| T9 | 1-0009 | FAILED | 2-0009 | FAILED | (x9,y9,z9) |
| T10 | 1-0010 | FAILED | 2-0010 | SUCCESSFUL | (x10,y10,z10) |

FIG. 11

| PHOTOGRAPHIC TIME ⌒1221 | IMAGE ID (CAMERA 2-1) ⌒1222 | RESULTANT INFORMATION (CAMERA 2-1) ⌒1223 | UNPROCESSED ⌒1224 | IMAGE ID (CAMERA 2-2) ⌒1225 | RESULTANT INFORMATION (CAMERA 2-2) ⌒1226 |
|---|---|---|---|---|---|
| T1 | 1-0001 | SUCCESSFUL | 2-0001 | FAILED | (x1,y1,z1) |
| T2 | 1-0002 | SUCCESSFUL | 2-0002 | SUCCESSFUL | (x2,y2,z2) |
| T3 | 1-0003 | FAILED | 2-0003 | SUCCESSFUL | (x3,y3,z3) |
| T4 | 1-0004 | SUCCESSFUL | 2-0004 | SUCCESSFUL | (x4,y4,z4) |
| T5 | 1-0005 | SUCCESSFUL | 2-0005 | FAILED | (x5,y5,z5) |
| T6 | 1-0006 | FAILED | 2-0006 | SUCCESSFUL | (x6,y6,z6) |
| T7 | 1-0007 | SUCCESSFUL | 2-0007 | SUCCESSFUL | (x7,y7,z7) |
| T8 | 1-0008 | SUCCESSFUL | 2-0008 | FAILED | (x8,y8,z8) |
| T9 | 1-0009 | SUCCESSFUL | 2-0009 | SUCCESSFUL | (x9,y9,z9) |
| T10 | 1-0010 | FAILED | 2-0010 | SUCCESSFUL | (x10,y10,z10) |

CAMERA CONTROL METHOD, CAMERA CONTROL DEVICE, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-181987, filed on Sep. 22, 2017, the entire contents of which are incorporated herein by reference.

FIELD

The embodiments discussed herein are related to a camera control method, a camera control device, and a non-transitory computer-readable storage medium.

BACKGROUND

There is a technique to identify the position of a subject (object) in real space from an image which includes the subject and is captured by a camera. When a correspondence relationship between the coordinates on an image and the position (coordinates) in real space is identified, it is possible to determine the position of an object in real space when an image is captured based on the image of the object captured by a camera.

In order to identify the correspondence relationship between the coordinates on the image and the coordinates in real space, for instance, calibration (correction) of the camera which acquires an image is performed.

Here, calibration is the process by which an object with known size and position (coordinates) in real space is photographed by a camera, the coordinates of the object on an acquired image are identified, and thus parameters for converting two-dimensional coordinates on the image to three-dimensional coordinates in real space (or the other way around) are acquired. In this manner, information on the characteristics of the camera is acquired.

For instance, an object (hereinafter referred to as a calibration pattern) having a shape extractable from an image by image processing or the like is photographed by camera fixed to a predetermined position in real space. In this process, when the positions (coordinates) of each of the camera and the object in real space are known, and the coordinates of the photographed object on the image are identified by image processing or the like, it is possible to identify the correspondence relationship between the coordinates on the image and the coordinates in real space.

Related techniques are disclosed in, for example, Japanese Laid-open Patent Publication No. 2011-101265.

SUMMARY

According to an aspect of the invention, a camera control method executed by a computer, the camera control method including performing first detection processing that detects a plurality of predetermined patterns at different positions in real space from one or more images captured by a first camera, acquiring camera characteristic information on the first camera based on one or more first predetermined patterns, included in the plurality of predetermined patterns, successfully detected in the first detection processing, correcting the one or plurality of images based on the acquired camera characteristic information, performing second detection processing to detect one or more second predetermined patterns, included in the plurality of predetermined patterns, failed to be detected in the first detection processing, the one or plurality of second predetermined patterns being included in the one or more images on which the correcting has been performed, and updating the camera characteristic information based on the detected one or more second predetermined patterns.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates example data stored in a management information storage unit;

FIG. 6 illustrates example data stored in the management information storage unit when a series of processing illustrated in FIG. 4 is performed;

FIG. 11 illustrates example data stored in the management information storage unit when a series of processing illustrated in FIGS. 9A and 9B is performed;

DESCRIPTION OF EMBODIMENTS

Here, a camera mounted with a lens having a wide range of viewing angle (for instance, a lens called a fisheye lens) may be used.

Although such a camera has an advantage in that a wide region in real space is covered by a single image, in an area with a larger incident angle to the lens (an area near the outer side of an image), more distortion occurs in the image. When a calibration pattern is present in an area with a larger incident angle, the shape of the calibration pattern in the image is deformed with respect to the real calibration pattern. For this reason, the calibration pattern may not be recognized by image processing, in other words, the coordinates of the captured calibration pattern on the image may not be identified.

In an area in which the calibration pattern is not recognizable, it is not possible to perform calibration, or even if it is possible, the accuracy of acquired information (parameters) is significantly reduced.

In an aspect, it is aimed to improve the accuracy of acquired camera characteristic information in consideration of distortion of an image.

An example of the present disclosure will be described with reference to the drawings.

[Overview]

Figure 1:
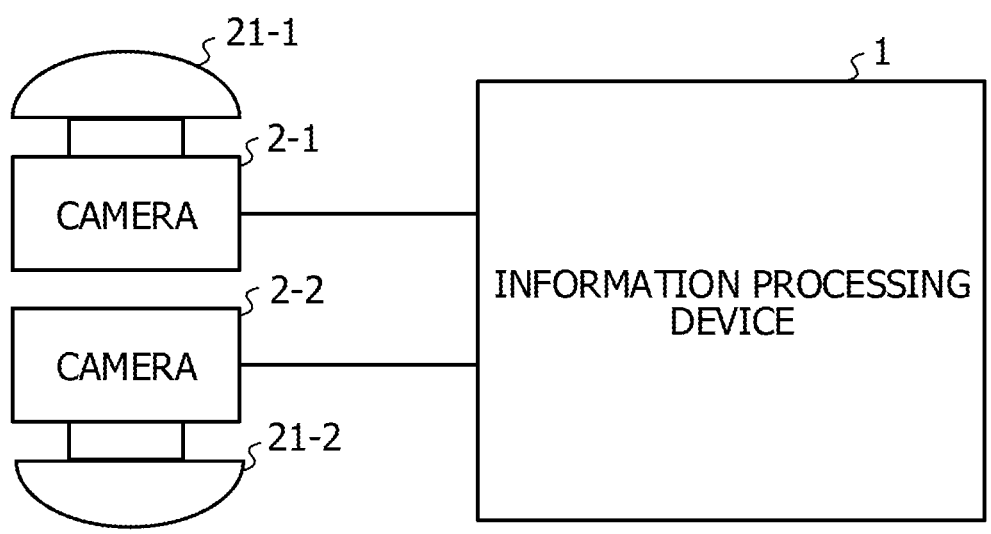
FIG. 1 is a schematic diagram of an embodiment according to this example.

FIG. 1 is a schematic diagram of an embodiment according to the example. FIG. 1 illustrates an information processing device 1, and cameras 2-1, 2-2.

The cameras 2-1 and 2-2 are imaging devices on which fisheye lens 21-1 and 21-2 are mounted, respectively. When the viewing angle of each of the cameras 2-1, 2-2 is greater than or equal to 180 degrees, it is possible to obtain a 360 degree image (omnidirectional image), for instance, by installing the cameras 2-1, 2-2 so that the fisheye lens 21-1 and fisheye lens 21-2 face in opposite directions as illustrated in FIG. 1.

The information processing device 1 is a computer connected to the cameras 2-1, 2-2 via a wire or wirelessly to allow communication, and performs control of image acquisition using the cameras 2-1, 2-2. The information processing device 1 is an information processing device such as a personal computer (PC), a smartphone, a personal digital assistant (PDA), for instance.

The various types of processing described in this example may be performed by an integrated device having the functions of the information processing device 1 and the cameras 2-1, 2-2.

[Functional Configuration of Information Processing Device 1]

Figure 2:
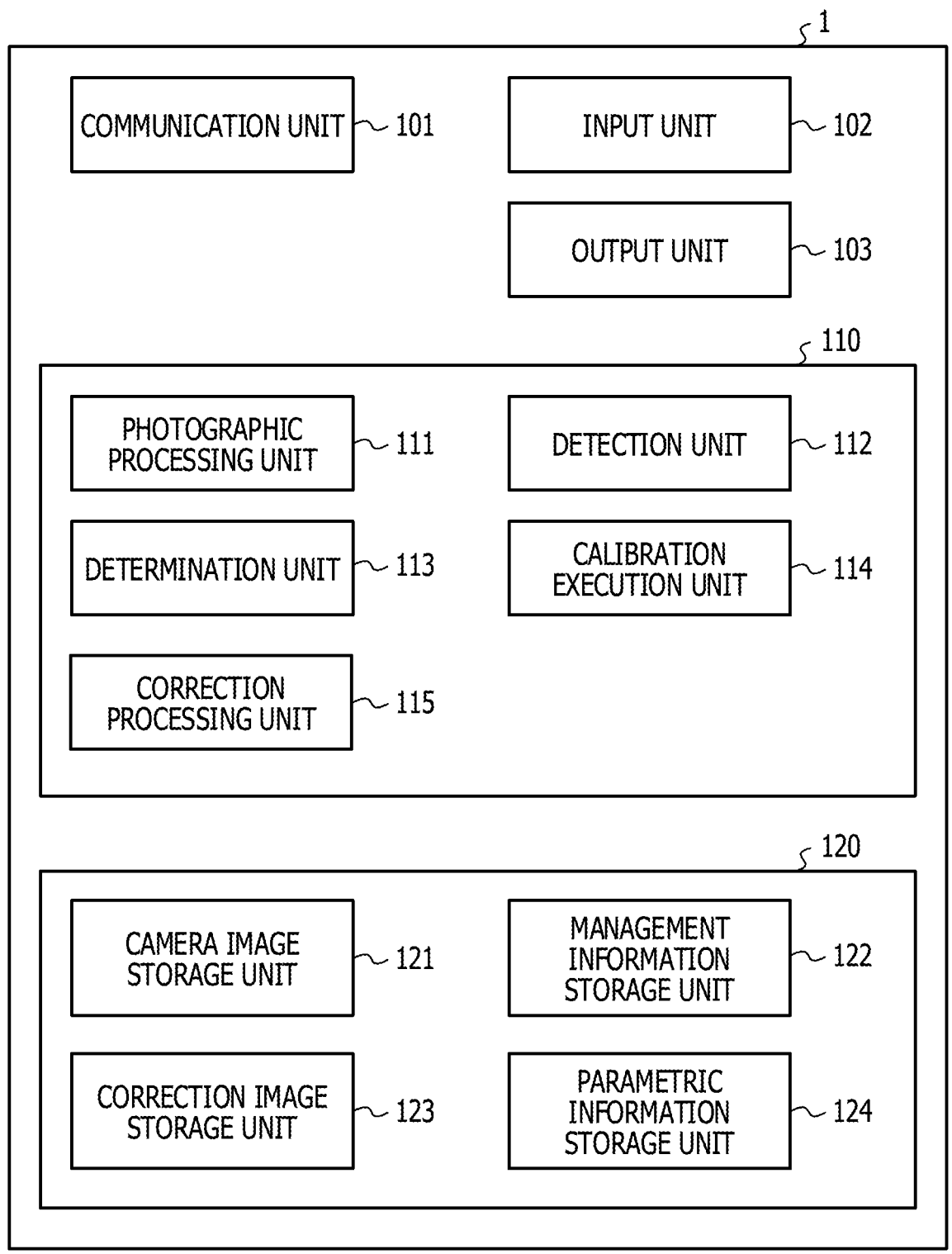
FIG. 2 is a functional block diagram illustrating the functional configuration of an information processing device.

FIG. 2 is a functional block diagram illustrating the functional configuration of the information processing device 1. The information processing device 1 includes, for instance, a communication unit 101, an input unit 102, an output unit 103, a processing unit 110, and a storage unit 120.

The communication unit 101 is capable of communicating with other devices including the cameras 2-1, 2-2 via a wire or wirelessly. The communication unit 101 is, for instance, a communication device such as a network adaptor or a network interface controller (NIC) included in the information processing device 1. Alternatively, the communication unit 101 is a communication port for wired connection such as Universal Serial Bus (USB), or a transmitting and receiving device for wireless communication.

The input unit 102 receives information input or an operation from a user. The input unit 102 is, for instance, a keyboard, a mouse, or a touchpad.

The output unit 103 is capable of outputting, for instance, an image acquired by the cameras 2-1, 2-2, a result of image processing using the acquired image, and a result of the later-described calibration. The output unit 103 is, for instance, a liquid crystal display as hardware.

The processing unit 110 includes a photographic processing unit 111, a detection unit 112, a determination unit 113, a calibration execution unit 114, and a correction processing unit 115.

The photographic processing unit 111 controls photographing of an image. For instance, when an omnidirectional image is captured using the cameras 2-1, 2-2, the photographic processing unit 111 performs control to synchronize the timing of photographing by the cameras 2-1, 2-2.

The detection unit 112 detects feature points (the details will be described later) used for processing of calibration, from an image acquired by the cameras 2-1, 2-2.

The determination unit 113 makes determination on a result of detection of feature points made by the detection unit 112.

The calibration execution unit 114 performs camera calibration on at least one of cameras 2-1, 2-2 based on the feature points detected by the detection unit 112. As a result of calibration, the calibration execution unit 114 acquires camera parameters (the later-described internal parameter and external parameter of the camera). The acquisition unit in the present application corresponds to the calibration execution unit 114, for instance.

The correction processing unit 115 performs correction processing on the acquired image using the camera 2-1 or camera 2-2.

The operation of each functional unit described above will be described in detail later along with the flow of a series of processing in this example.

The storage unit 120 includes a camera image storage unit 121, a management information storage unit 122, a correction image storage unit 123, and a parametric information storage unit 124.

The camera image storage unit 121 stores the data of an image captured using the cameras 2-1, 2-2.

The management information storage unit 122 stores information on an image captured using the cameras 2-1, 2-2.

The correction image storage unit 123 stores a camera image corrected by the correction processing unit 115.

The parametric information storage unit 124 stores camera parameters acquired as a result of calibration performed by the calibration execution unit 114. Each camera parameter is information that indicates the characteristics of a camera, and includes, for instance, an internal parameter and an external parameter of the camera.

It is to be noted that the internal parameter is a parameter related to conversion of coordinates between the coordinates in real space and the coordinates on a camera image. In addition, the internal parameter is a parameter that indicates a focal length, a deviation of an image center, distortion of a lens and other factors.

Also, the external parameter is a parameter that indicates the position and arrangement of a camera in real space. The external parameter is represented, for instance, as a relative position (rotated, translated around or from an origin) of a camera with respect to a predetermined origin in real space.

The information stored in each storage unit described above will be described in detail later along with the flow of a series of processing in this example.

[Acquisition of Image]

First, acquisition (photographing) of an image used for calibration in this example will be described. Although the camera 2-1 (one camera) will be first described as an example, similar processing may also be performed when the camera 2-2 is used.

In calibration, an image of an object captured by the camera 2-1 fixed to a specific position in real space is acquired, the object having known size and position in real space.

Figure 3:
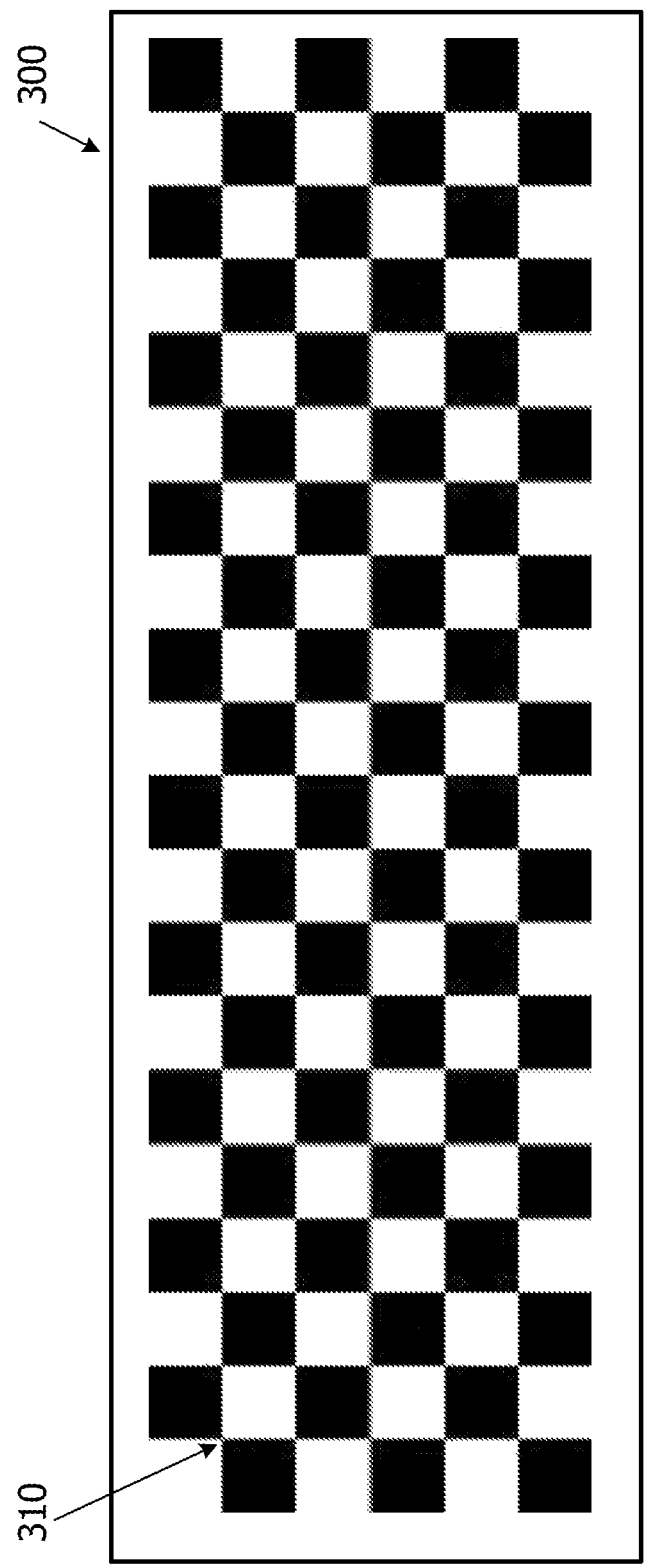
FIG. 3 illustrates an example object captured using a camera.

FIG. 3 is a pattern illustrating an example object to be photographed using the camera 2-1. An object photographed using the camera 2-1 may be, for instance, a flat plate 300 with a checkered pattern as illustrated in FIG. 3. It is to be noted that the checkered pattern of the flat plate 300 may be referred to as the "lattice pattern" in the following description. A feature point used for calibration is, for instance, a point of contact (for instance, a point 310 of FIG. 3) between squares included in the checkered pattern. When each point of contact between squares included in the checkered pattern serves as a feature point, the flat plate 300 of FIG. 3 contains a total of 95 (vertically 5×horizontally 19) feature points including the point 310.

When an image for the photographic processing unit is captured with the flat plate 300 installed within an imaging range of the camera 2-1 in real space, and a camera image including feature points used for calibration is acquired. In this process, the entire flat plate 300 has to be included in the imaging range of the camera 2-1, and the position of the flat plate 300 in real space at the time of photography and the dimensions of each square (relative positional relationship between the feature points) in the lattice pattern have to be identified beforehand. Also, it is desirable that multiple camera images be captured with different positions of the flat plate 300 in consideration of improvement of the accuracy of calibration.

The flat plate 300 is only an example of an object. As long as an object has a known size and feature points are detectable from a camera image by image processing such as pattern matching, the object is not uniquely limited to the aspect illustrated.

[Calibration Processing (First Stage)]

The processing of calibration in this example will be described. In the following description, it is assumed that multiple camera images used for calibration have been acquired beforehand based on the above-described aspect. Also, in the following, a description is given by once focusing attention on the images captured using the camera 2-1 and the camera 2-2.

Figure 4:
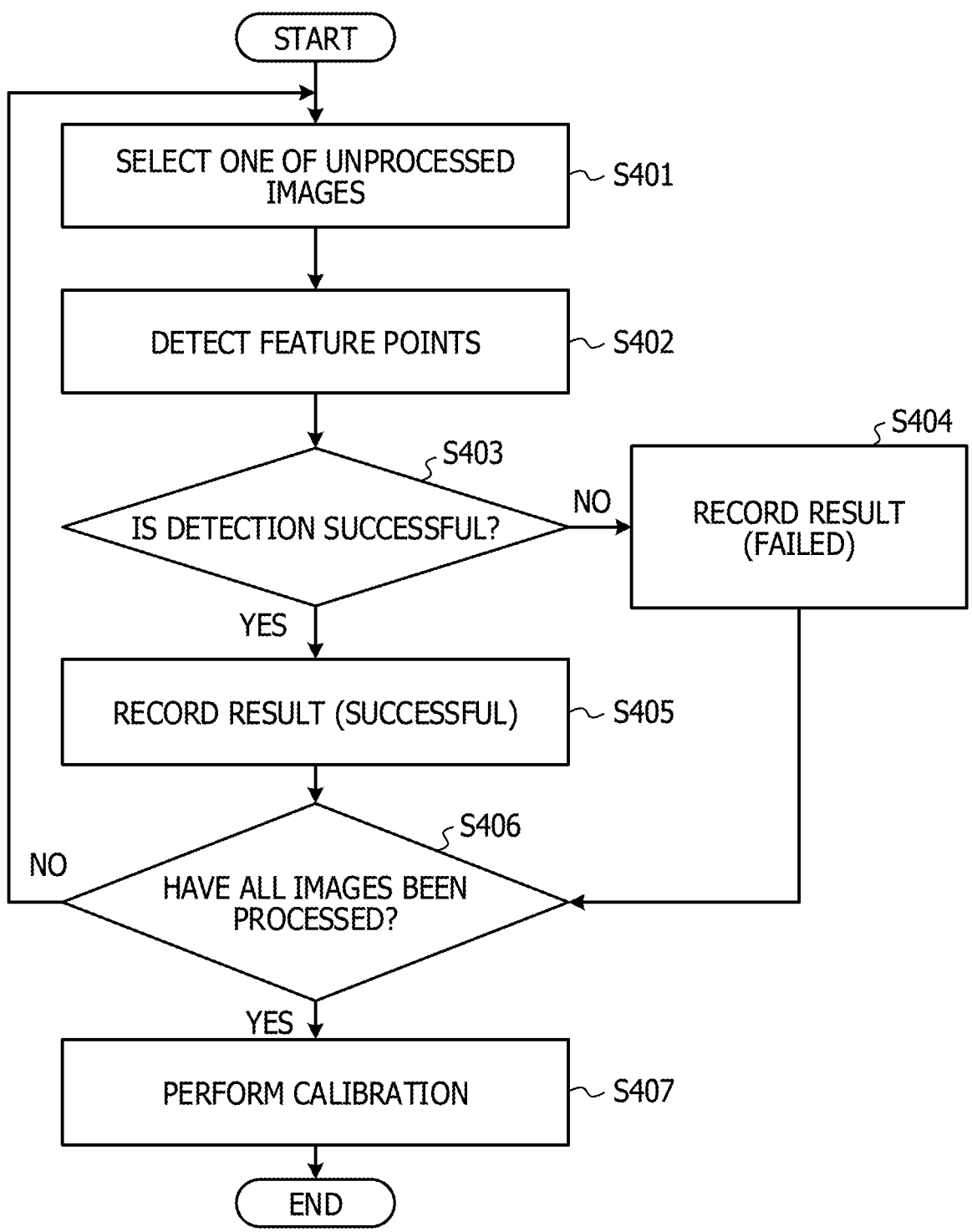
FIG. 4 is flowchart illustrating the flow of a series of processing of calibration processing (first stage)

FIG. 4 is flowchart illustrating the flow of a series of processing of calibration processing (first stage).

First, the detection unit 112 selects one of unprocessed images from the images which have been captured using the camera 2-1 and stored in the camera image storage unit 121 (step S401). Here, the unprocessed images refer to those images that have not undergone the later-described processing in step S402.

FIG. 5 is a table illustrating example data stored in the management information storage unit 122. As illustrated in FIG. 5, the management information storage unit 122 stores, for instance, a photographic time 1221, an image identifier (ID) (camera 2-1) 1222, resultant information (camera 2-1) 1223, an image ID (camera 2-2) 1224, resultant information camera (2-2) 1225, and real space position 1226 in association with each other.

The photographic time 1221 is information indicating a time when an image is captured. FIG. 5 illustrates that images are captured by the two cameras 2-1, 2-2 at the same timing using synchronous control performed by the photographic processing unit 111. This is because in the camera calibration for photographing an omnidirectional image, images of the object (the flat plate 300) at the same real space position have to be used. However, as long as images of the object at the same real space position are acquirable by the cameras 2-1, 2-2, and it is possible to associate each real space position with an image, the photographic times of images do not have to agree.

The image ID (camera 2-1) 1222 is identification information for uniquely identifying each of the images captured by the camera 2-1. In FIG. 5, the values "1-0001" to "1-0010" are used for the sake of convenience. However, as long as each of the images is uniquely identifiable, specific values may be different from the values of FIG. 5.

The resultant information (camera 2-1) 1223 is information indicating a result of detection of feature points made by the detection unit 112 for each of the images. In this example, the resultant information (camera 2-1) 1223 may have three statuses (the details will be described later): unprocessed, successful, and failed. For instance, in FIG. 5, the status of unprocessed is denoted as "unprocessed", which indicates an image that has not undergone the later-described processing in step S402. However, when the statuses are distinguishable, the data format is not limited to the format of FIG. 5, and may be a numerical format or a bit format, for instance.

The image ID (camera 2-2) 1224 is identification information for uniquely identifying each of the images captured by the camera 2-2. In FIG. 5, the values "2-0001" to "2-0010" are used for the sake of convenience. However, as long as each of the images is uniquely identifiable, specific values may be different from the values of FIG. 5.

Similarly to the resultant information (camera 2-1) 1223, the resultant information (camera 2-2) 1225 is information indicating a result of detection of feature points for each of the images acquired by the camera 2-2.

The real space position 1226 provides, for instance, real space coordinates that indicate the position of the object (flat plate 300) at the photographic time point of each of the images. Here, the real space coordinates may indicates for instance, three-dimensional coordinates with the origin at a predetermined point in real space, and the arrangement or orientation of the flat plate 300. However, setting of coordinates does not have to be uniquely limited, and may be any setting as long as the real space position of each feature point along with the dimensions of the lattice pattern are calculable.

The data illustrated in FIG. 5 allows the information processing device 1 to perform control of the progress of the calibration processing in this example, and to grasp a progressing state and a result of the calibration processing.

Returning to the description of FIG. 4, the processing in step S401 may be described as processing to select one image with the value of the resultant information (camera 2-1) 1223 of "unprocessed" by the detection unit 112.

Subsequently, the detection unit 112 detects feature points corresponding to the lattice pattern from the image selected in step S401 (step S402). Although the detection of feature points is feasible, for instance, by image processing such as pattern matching based on the shape of the lattice pattern, a specific technique does not have to be limited to the pattern matching.

The determination unit 113 determines a result of detection of feature points performed in step S402 (step S403). For instance, when the number of feature points detected in step S402 is the same as the number of points (95 for the flat plate 300 of FIG. 3) detectable based on the lattice pattern, the determination unit 113 determines that the detection has been successful. On the other hand, when the number of feature points detected in step S402 is different from (smaller than) the number of points detectable based on the lattice pattern, the determination unit 113 determines that the detection has been failed.

When the detection is determined to be failed (NO in step S403), the determination unit 113 records a result indicating detection failure for the image selected in step S401. Specifically, the determination unit 113 updates the value of the resultant information (camera 2-1) 1223 stored in the management information storage unit 122 for the image selected in step S401 to "failed" (step S404). Consequently, for the image selected in step S401, a result indicating detection failure and a result indicating that the image selected in step S401 has been processed (the processing in step S402 has been performed) are stored in the management information storage unit 122.

On the other hand, when the detection is determined to be successful (YES in step S403), the determination unit 113 records a result indicating detection success for the image selected in step S401. Specifically, the determination unit 113 updates the value of the resultant information (camera 2-1) 1223 stored in the management information storage unit 122 for the image selected in step S401 to "successful" (step S405). Consequently, for the image selected in step S401, a result indicating detection success and a result indicating that the image selected in step S401 has been processed (the processing in step S402 has been performed) are stored in the management information storage unit 122.

After the processing in step S404 or S405 is performed, the detection unit 112 determines whether or not all target images have been processed in step S401 (step S406). When an unprocessed image is present (the value of "unprocessed" is present in the data column of the resultant information (camera 2-1) 1223) (NO in step S406), the flow returns to step S401, and the information processing device 1 selects one unprocessed image, and repeatedly performs a series of processing described above.

On the other hand, when all target images have been processed (YES in step S406), the calibration execution unit 114 performs calibration of the camera 2-1 using the images (the images having the value of the resultant information (camera 2-1) 1223 of "successful") with feature points successfully detected (step S407). The internal parameter and the external parameter for the camera 2-1 are acquired by performing the calibration. The calibration execution unit 114 stores the internal parameter and the external parameter acquired by the calibration into the parametric information storage unit 124. In the camera calibration, when the accuracy of derived camera parameters is taken into consideration, it is desirable that multiple images with successful detection of feature points be present (in other words multiple patterns of images usable for calibration be present). Thus, before execution of step S407, the calibration execution unit 114 may determine whether or not the number of images with successful detection of feature points is greater than or equal to a predetermined number (for instance, three), and when the number of images with successful detection of feature points is greater than or equal to a predetermined number, the calibration execution unit 114 may perform calibration.

After step S407 is performed, a series of processing illustrated in FIG. 4 is completed.

[Problem in Calibration Processing (First Stage)]

FIG. 6 is a table illustrating example data stored in the management information storage unit 122 when a series of processing (at least up to the stage in which determination of YES is made in step S406) illustrated in FIG. 4 is performed. In FIG. 6, a series of processing illustrated in FIG. 4 has been performed for the camera 2-1 in the same manner as the above-described processing for the camera 2-1.

For instance, when attention is focused on the resultant information (camera 2-1) 1223 of FIG. 6, detection of feature points is successful for three images out of 10 images. Since the images with feature points successfully detected have been acquired, minimum conditions for acquiring camera parameters by calibration for the camera 2-1 are satisfied.

However, from the viewpoint of improving the accuracy of acquired camera parameters, when feature points are detected at more, various positions in real space, improvement of the accuracy is expected. Thus, the greater number of images with successful detection of feature points probably increases the accuracy of the camera parameters. However, in the example of FIG. 6, detection of feature points is successful for 3 images but is failed for 7 images, thus there is a possibility that the accuracy of the camera parameters may not be sufficiently ensured.

At least two reasons for failure of detection of feature points in an image may be considered.

The first reason is that, first of all, the flat plate 300 itself is not captured in an image. For instance, when an omnidirectional image is captured using the cameras 2-1, 2-2, if the flat plate 300 is captured near the center of the field of view of one of the cameras in calibration, the flat plate 300 may be outside the field of view of the other camera. However, in this case, failure is due to the fact that the flat plate 300 is outside the field of view of the other camera, and if detection of feature points is successful in the one image of the camera which has captured the flat plate 300 in the field of view, no problem arises. For instance, for the camera 2-1, failure of detection of feature points at photographic times T3, T6, and T10 in FIG. 6 is probably due to the first reason.

The second reason is that although the flat plate 300 is captured in an image in its entirety, detection of feature points is not possible.

Figure 7A:
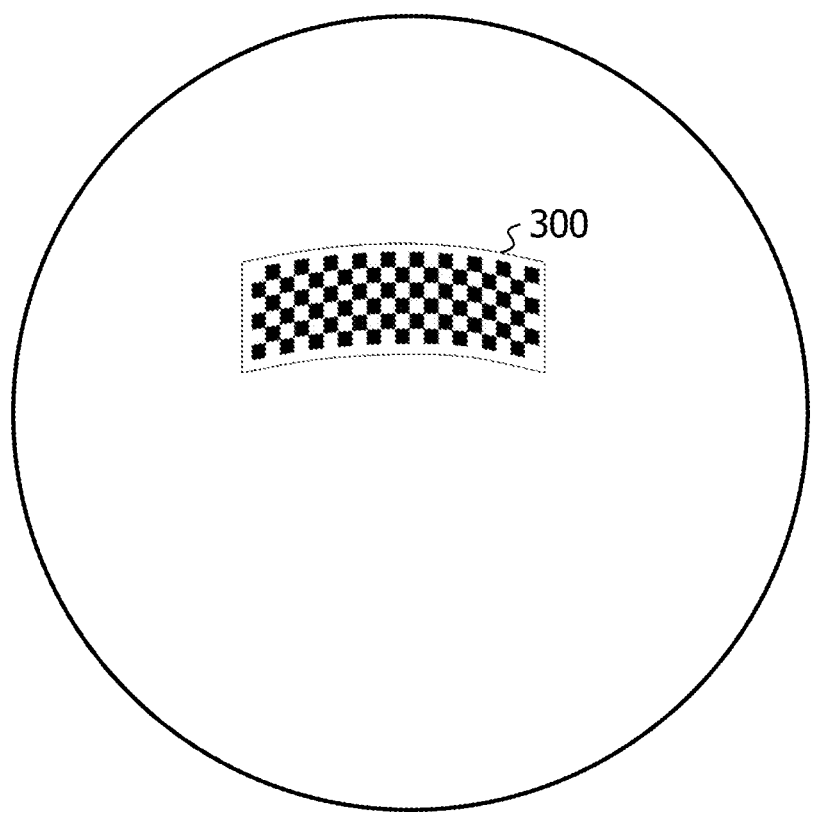
FIG. 7A illustrates an example image in which a flat plate is captured in its entirety near the center of the image.
Figure 7B:
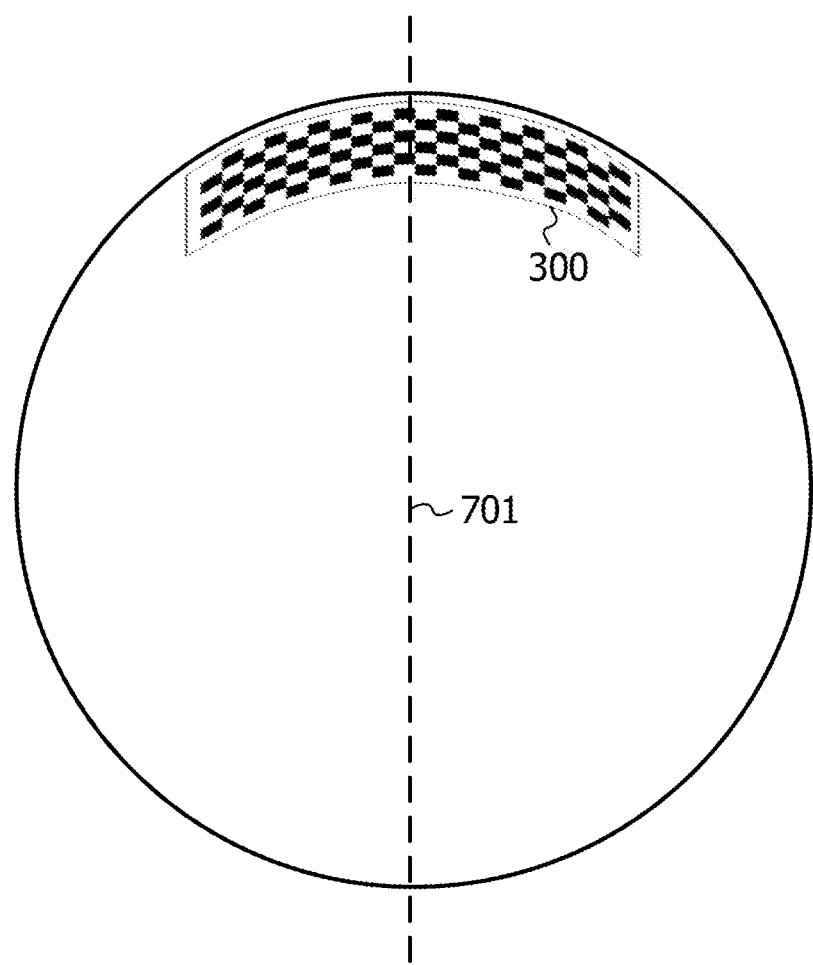
FIG. 7B illustrates an example image in which the flat plate is captured in its entirety near the outer edge of the image.

FIGS. 7A and 7B are each an example image in which the flat plate 300 is captured in its entirety in the image. An image captured by a camera having a lens with a wide viewing angle like a fisheye lens has such characteristics that in an area with a larger incident angle to the lens (an area near the outer side of an image), more distortion occurs in the image. Due to the characteristics, the degree of deformation (distortion) of the flat plate 300 in a captured image significantly varies according to the incident angle to the fisheye lens 21-1 in the area in which the flat plate 300 is installed in real space, in other words, the installation position of the flat plate 300 in real space.

In the image of FIG. 7A, the position of the flat plate 300 in the image is closer to the central area of the image than the image of FIG. 7B, that is, the incident angle to the fisheye lens 21-1 is smaller. In this case, the distortion of the flat plate 300 in the image is relatively small, and it is probable that feature points are successfully detected by image processing such as pattern matching. In contrast, in the image of FIG. 7B, in which the position of the flat plate 300 in the image is closer to the outer side than the image of FIG. 7A, that is, the incident angle to the fisheye lens 21-1 is larger, the shape of the flat plate 300 in the image is significantly deformed (highly distorted). In this case, the shape of the flat plate 300 is significantly different from the actual flat plate 300, and thus detection of feature points is difficult.

Therefore, in an image in which the position of the flat plate 300 is located at an area on the outer side of the image, detection of feature points is failed, and as a consequence, a situation occurs in which calibration particularly for an area on the outer side of the image is not sufficiently performed. Quite simply, the accuracy of the camera parameter acquired by calibration is reduced.

Figure 8:
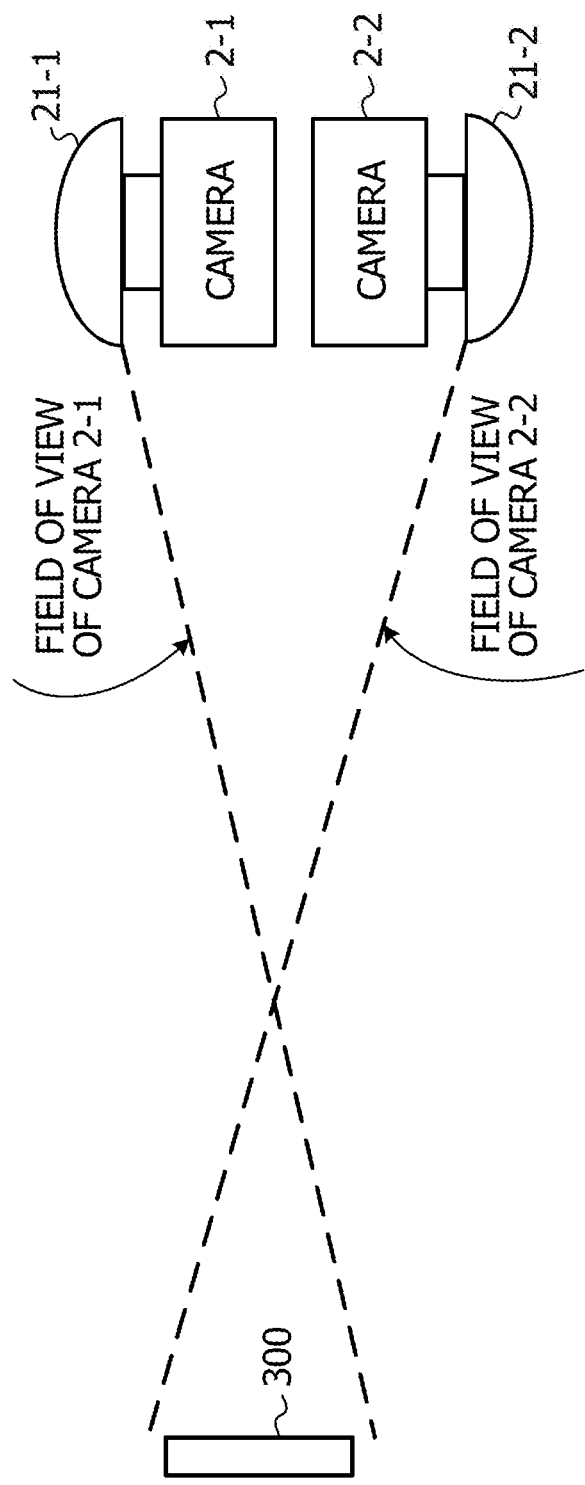
FIG. 8 illustrates an example in which the flat plate is captured within a field of view by both the camera and another camera.

Particularly when an omnidirectional image is captured using the cameras 2-1, 2-2, failure of detection of feature points due to the second reason causes a problem. This is because when the flat plate 300 is attempted to be captured in the field of view by the two cameras, as illustrated in FIG. 8, the flat plate 300 is located at an area on the outer side of the image in each of the two cameras. In this case, even though the flat plate 300 is included in the camera image of each of the both cameras 2-1, 2-2, it is probable that detection of feature points is failed due to the distortion of the image. For instance, in the camera 2-1 (and the camera 2-2), failure of detection of feature points at photographic times T2, T4, T7, and T9 in FIG. 6 is probably due to the first reason.

In consideration of the above-mentioned problem, the later-described calibration processing (second stage) is performed in this example.

[Calibration Processing (Second Stage)]

Figure 9A:
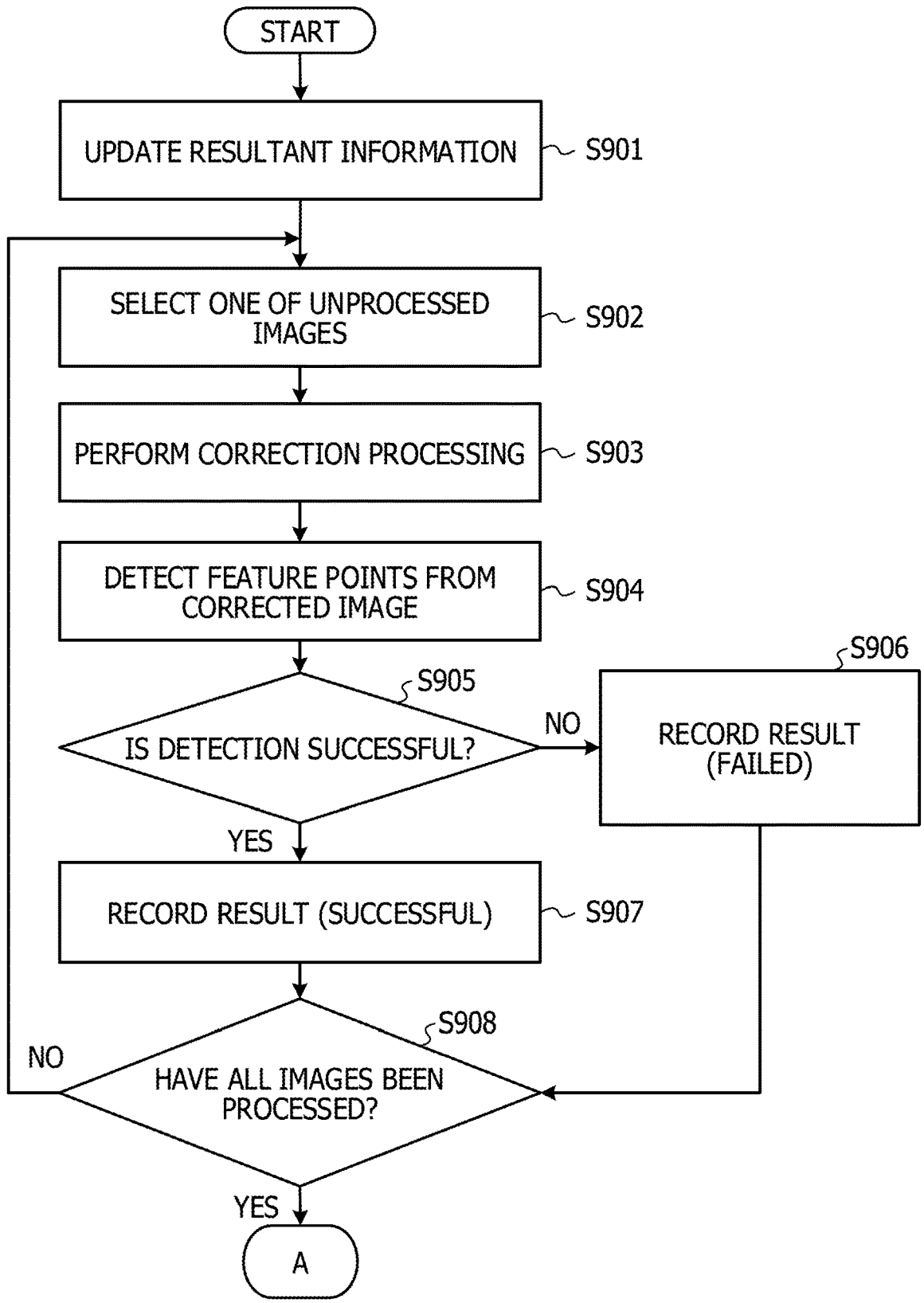
FIG. 9A illustrates a flowchart (part one) depicting the flow of a series of processing of the calibration processing (second stage)
Figure 9B:
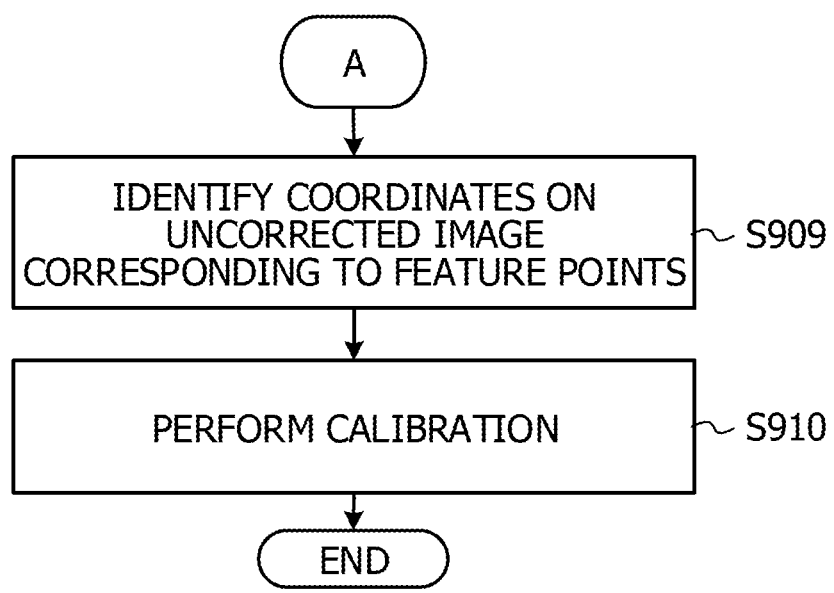
FIG. 9B illustrates a flowchart (part two) depicting the flow of a series of processing of the calibration processing (second stage)

FIGS. 9A and 9B are each a flowchart depicting the flow of a series of processing of the calibration processing (second stage). In the following, similarly to the description of the calibration processing (first stage), a description is given by once focusing attention on the images captured using the camera 2-1 and the camera 2-1.

First, the detection unit 112 updates (changes) all data values of "failed" in the data column of the resultant information (camera 2-1) 1223 to "unprocessed" (step S901). It is to be noted that the processing in step S901 is processing for distinguishing between the case (case 1) where the data value is "failed" because the later-described processing in step S904 has not been performed and the case (case 2) where the data value is "failed" because a detection result in step S904 indicates failure. As long as the case 1 and the case 2 become distinguishable, the processing in step S901 may be substituted by processing different from the processing in this example. Alternatively, regardless of success or failure of detection of feature points in the calibration processing (first stage), the calibration processing (second stage) may be performed on all the images. In this case, in step S901, the detection unit 112 updates all data values in the data column of the resultant information (camera 2-1) 1223 to "unprocessed".

Subsequently, the detection unit 112 selects one of unprocessed images from the images which have been captured using the camera 2-1 and stored in the camera image storage unit 121 (step S902). Here, the unprocessed images refer to those images that have not undergone the later-described processing in step S904. The processing in step S902 may be described as processing to select one image with the value of the resultant information (camera 2-1) 1223 of "unprocessed" by the detection unit 112.

Subsequently, the correction processing unit 115 performs correction processing on the image selected in step S902 (step S903). The correction processing removes or reduces distortion in a selected image. The correction processing generates an equidistant cylindrical image using, for instance, the image selected in step S902, and the internal parameter of the camera 2-1 acquired in the calibration processing (first stage). It is to be noted that an image generated as a result of the correction processing, including an equidistant cylindrical image may be referred to as a "corrected image" in the following description.

Figure 10:
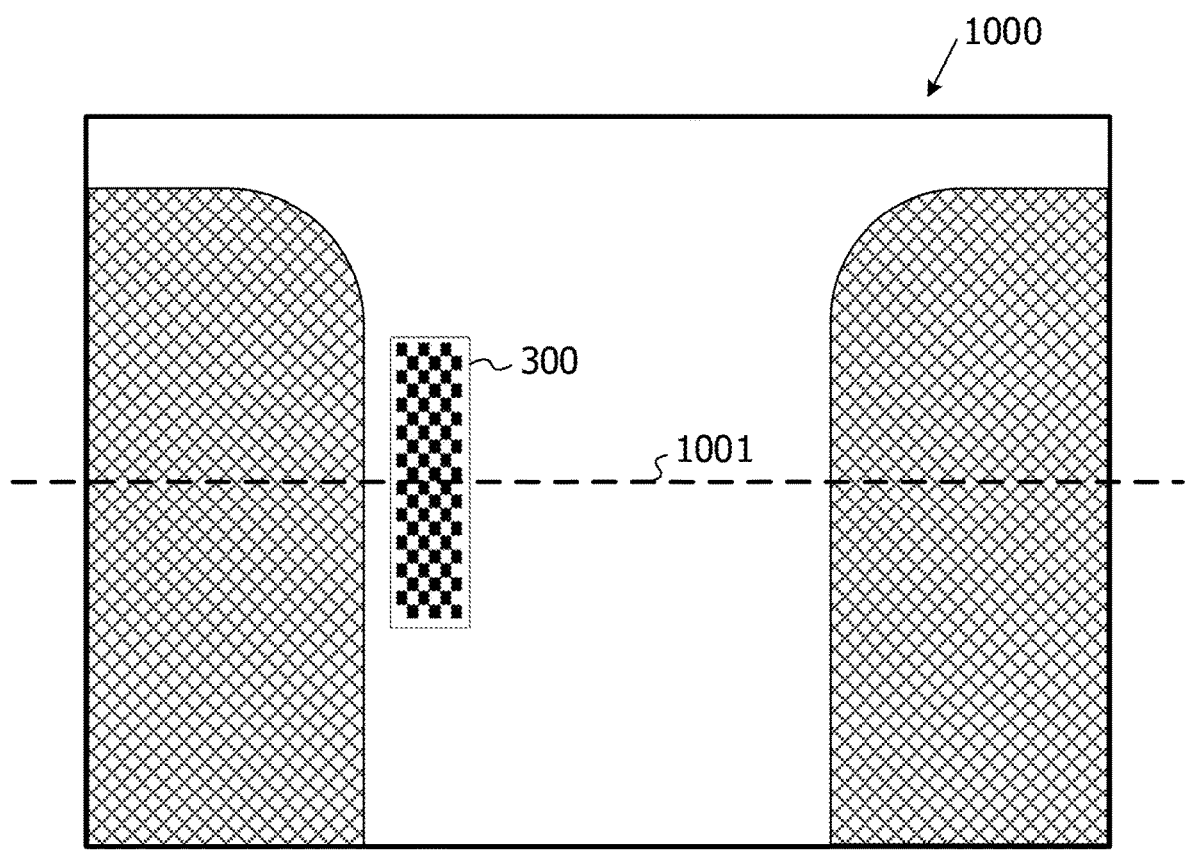
FIG. 10 illustrates an example corrected image corresponding to the image of FIG. 7B.

FIG. 10 illustrates an example corrected image corresponding to the image of FIG. 7B. For instance, the correction processing unit 115 generates an image (corrected image 1000) of an equidistant cylindrical image corresponding to the image of FIG. 7B so that a line 701 in FIG. 7B is the equator of the equidistant cylindrical image. The coordinates on the line 701 in FIG. 7B are located on a line 1001 (the equator in the corrected image 1000) of FIG. 10. It is to be noted that the shaded area in FIG. 10 is an area that is outside the field of view of the image of FIG. 7B and is not captured in the image of FIG. 7B.

Here, the line 701 in FIG. 7B passes through a central portion or its vicinity of the flat plate 300 of the image in FIG. 7B. The correction processing unit 115 identifies a line, like the line 701, which passes through the center of the flat plate 300 in the camera image, and sets the equator of an equidistant cylindrical image, thereby making it possible to generate an azimuthal equidistant chart in which the flat plate 300 located near the equator. Particularly an area near the equator in the azimuthal equidistant chart allows distortion of an image to be suppressed at a low level, and thus it is possible to further enhance the effect of the correction processing.

To determine the central position of the flat plate 300 in the camera image (before correction), the correction processing unit 115 may identify the approximate outline of the flat plate 300 in the camera image (before correction), for instance, by image processing, and may determine the center of the identified approximate outline to be the center position of the flat plate 300. However, the center position determined in this process does not have to be the exact center of the flat plate 300, and it is sufficient that an approximate center position be identified. This is because in order to suppress the distortion of the image of the flat plate 300 in the azimuthal equidistant chart at a low level, a sufficient effect of suppression of distortion may be expected when the position of the flat plate 300 is in the vicinity of the equator.

As illustrated in FIG. 10, in the flat plate 300 in the corrected image 1000, the distortion of the image is reduced as compared with the flat plate 300 of the image in FIG. 7B. Consequently, it is probable that a feature point which has not been detected in the image before the correction is detectable in the corrected image. Particularly, in the correction processing by generating an equidistant cylindrical image, it is expected that curved distortion of the flat plate 300 as illustrated in FIG. 7B is significantly reduced. In detection of feature points by pattern matching, curved distortion has a significant effect, whereas the detection is relatively unsusceptible to variation in aspect ratio and linear deformation using homography conversion. Therefore, possibility of detection of feature points is probably increased significantly. The correction processing unit 115 may store a generated corrected image in the correction image storage unit 123 for the subsequent processing, for instance.

Returning to the description of FIG. 9A, after the correction processing in step S903 is performed, the detection unit 112 detects feature points corresponding to the lattice pattern from the corrected image (step S904). Although the detection of feature points is feasible, for instance, by image processing such as pattern matching based on the shape of the lattice pattern, a specific technique does not have to be limited to the pattern matching.

The determination unit 113 determines a result of detection of feature points performed in step S904 (step S905).

For instance, when the number of feature points detected in step S904 is the same as the number of points (95 for the flat plate 300 of FIG. 3) detectable based on the lattice pattern, the determination unit 113 determines that the detection has been successful. On the other hand, when the number of feature points detected in step S904 is different from (smaller than) the number of points detectable based on the lattice pattern, the determination unit 113 determines that the detection has been failed.

When the detection is determined to be failed (NO in step S905), the determination unit 113 records a result indicating detection failure for the image selected in step S902 (step S906). Specifically, the determination unit 113 updates the value of the resultant information (camera 2-1) 1223 stored in the management information storage unit 122 for the image selected in step S902 to "failed". Consequently, for the image selected in step S902, a result indicating detection failure and a result indicating that the image selected in step S902 has been processed (the processing in step S904 has been performed) are stored in the management information storage unit 122.

On the other hand, when the detection is determined to be successful (YES in step S905), the determination unit 113 records a result indicating detection success for the image selected in step S902 (step S907). Specifically, the determination unit 113 updates the value of the resultant information (camera 2-1) 1223 stored in the management information storage unit 122 for the image selected in step S902 to "successful". Consequently, for the image selected in step S902, a result indicating detection success and a result indicating that the image selected in step S902 has been processed (the processing in step S904 has been performed) are stored in the management information storage unit 122.

After the processing in step S906 or S907 is performed, the detection unit 112 determines whether or not all target images have been processed in step S902 (step S908). When an unprocessed image is present (the value of "unprocessed" is present in the data column of the resultant information (camera 2-1) 1223) (NO in step S908), the flow returns to step S902, and the information processing device 1 selects one unprocessed image, and repeatedly performs a series of processing described above.

On the other hand, when all target images have been processed (YES in step S908), the detection unit 112 identifies the coordinates on an uncorrected image corresponding to the feature points in the corrected image, which have been successfully detected in step S904. (step S909, the flow proceeds from FIG. 9A to FIG. 9B). In the process of processing in step S903, the correspondence relationship between the coordinates on the uncorrected image and the coordinates on the corrected image is identified, and invertible transformation may be performed. Therefore, when the coordinates of a feature point is identifiable in the corrected image, the coordinates on the uncorrected image corresponding to the feature point is identifiable by processing corresponding to the inverse transformation of the processing in step S904.

After step S909 is performed, the calibration execution unit 114 performs calibration of the camera 2-1 using the images (the images having the value of the resultant information (camera 2-1) 1223 of "successful") with feature points successfully detected (step S910). In step S910, it is possible to perform camera calibration using both the images with feature points successfully detected in the calibration processing (first stage) and the images with feature points successfully detected in the calibration processing (second stage).

The internal parameter and the external parameter for the camera 2-1 are acquired by performing the calibration. The calibration execution unit 114 stores the internal parameter and the external parameter acquired by the calibration into the parametric information storage unit 124. In other words, the calibration execution unit 114 updates the internal parameter and the external parameter for the camera 2-1. It is to be noted that the internal parameter and the external parameter acquired by the calibration processing (first stage) may be deleted from (overwritten in) the parametric information storage unit 124 in step S910, and after step S910 is performed, a series of processing illustrated in FIG. 4 is completed.

FIG. 11 is a table illustrating example data stored in the management information storage unit 122 when a series of processing (at least up to the stage in which determination of YES is made in step S908) illustrated in FIGS. 9A and 9B is performed. In FIG. 11, a series of processing illustrated in FIGS. 9A and 9B has been performed for the camera 2-1 in the same manner as the above-described processing for the camera 2-1.

When the respective states illustrated in FIG. 6 and FIG. 11 are compared, it is seen that detection of feature points failed, for instance, at photographic times T2, T4, T7, and T9 is now made possible (successful) by the calibration processing (second stage). Thus, it is seen that the occurrence of failure of detection of feature points due to (the second reason described above) distortion of the camera image is reduced.

As a result, for each of the cameras 2-1, 2-2, the success rate of detection of feature points has increased from 30% to 70% in this example. Consequently, it is possible to improve the accuracy of each camera parameter acquired by calibration.

[Technical Effect on Acquisition of Omnidirectional Image]

The capability of detection of feature points at photographic times T2, T4, T7, and T9 of FIG. 11 for both the cameras 2-1, 2-2 achieves a technical effect in the calibration for acquiring an omnidirectional image.

To acquire an omnidirectional image, the images acquired by the cameras 2-1, 2-2 have to be integrated. In order to integrate the images, when camera calibration is performed, the positional relationship between the cameras 2-1 and 2-2 has to be identified. Specifically, camera calibration is performed using a pair of an image acquired by the camera 2-1 and an image acquired by the camera 2-2 that satisfy the below-described conditions, and an external parameter for each camera has to be acquired. Condition 1: when the images are acquired, the positions of the flat plate 300 in real space are the same. Condition 2: the flat plate 300 (in its entirety) is in the field of view (captured in the image) for both the image acquired by the camera 2-1 and the image acquired by the camera 2-2.

A relative external parameter has to be determined based on the respective acquired external parameters of the camera 2-1 and the camera 2-2.

In the images which satisfy the conditions 1 and 2 described above, the flat plate 300 is located at an area with a larger incident angle to the lens (an area near the outer side of an image) for both camera 2-1 and camera 2-2. Therefore, it may be concluded that there is a high possibility that detection of feature points is failed due to the second reason described in [Problem in Calibration Processing (First Stage)].

However, with the processing described in this example, it is possible to reduce the occurrence of failure of detection of feature points due to the second reason described above. Thus, it is possible to perform camera calibration for two cameras on which fisheye lens is mounted as illustrated in this example, and to acquire an external parameter of each the two cameras. Then the difference between the external parameters of two cameras acquired at this point allows the information processing device 1 to identify the difference of the positions and the arrangements or orientations in real space between the camera 2-1 and the camera 2-2 in real space. In other words, it is possible for the information processing device 1 to acquire a relative external parameter between the camera 2-1 and the cameras 2-2.

[Other Modifications]

Various modifications may be made to the aspect described in this example.

For instance, in this example, the calibration processing (first stage) is performed on each of the camera 2-1 and camera 2-2. However, for instance when the camera 2-1 and the camera 2-2 have the same model number and model type, the internal parameters of the two cameras are probably similar or the same. Thus, for instance when the information processing device 1 performs calibration for the camera 2-1 and the camera 2-2 in that order, the calibration processing (first stage) for the camera 2-2 may be omitted. The information processing device 1 may perform image correction processing for the camera 2-2 using the camera parameter (internal parameter) acquired in the calibration processing (first stage) for the camera 2-1.

For instance, in this example, the information processing device 1 acquires the internal parameter used for correction processing of the calibration processing (second stage) by performing the calibration processing (first stage). However, when parameters serving as reference values (such as a reference value of parameter in which an individual difference between cameras is not taken into consideration) for the model type and model number of each camera used in this example are given, the correction processing of the calibration processing (second stage) may be performed utilizing an internal parameter included in the parameters serving as reference values.

In these modifications, it is possible to reduce the processing load associated with execution of calibration processing for multiple cameras.

Figure 12:
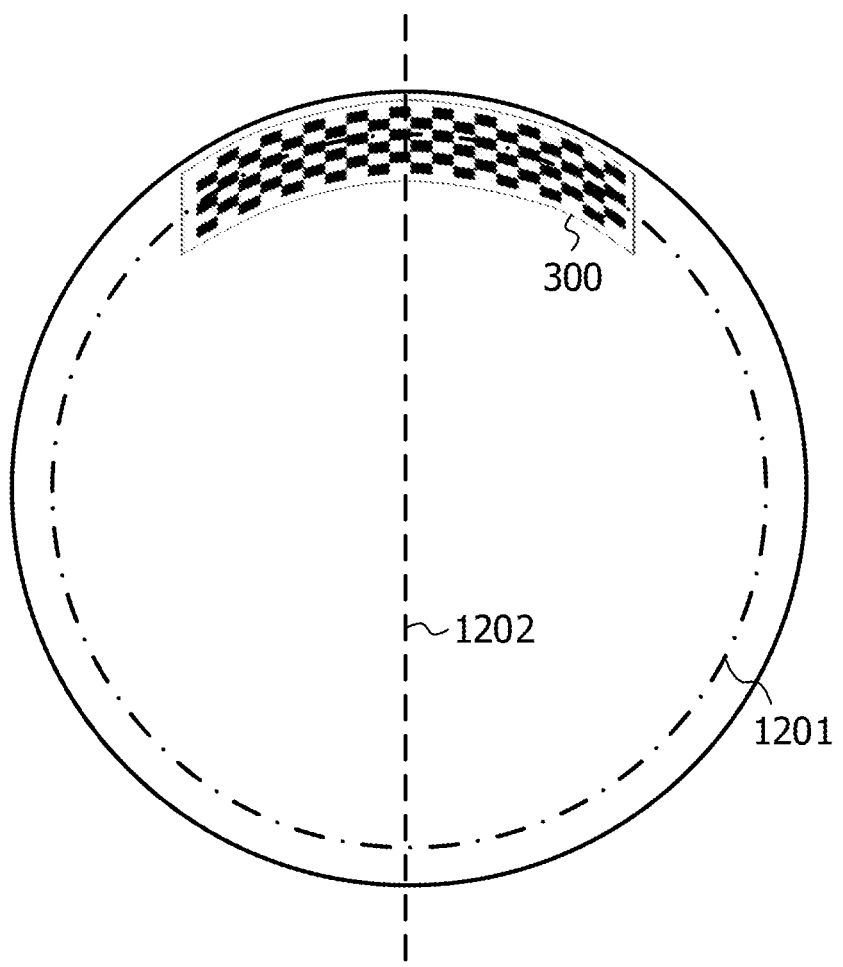
FIG. 12 illustrates a modification of equator setting in an equidistant cylindrical image.

When the correction processing described in this example is invertible transformation processing that allows distortion of an image to reduced, the correction processing may not be limited to correction processing using an equidistant cylindrical image. Also, various modifications may be adopted to correction processing using an equidistant cylindrical image. For instance, FIG. 12 is a view illustrating a modification of equator setting in an equidistant cylindrical image. As illustrated in FIG. 12, it is possible to generate an azimuthal equidistant chart with the flat plate 300 located near the equator by setting a line 1201 passing through the flat plate 300 as the equator of the equidistant cylindrical image.

Figure 13A:
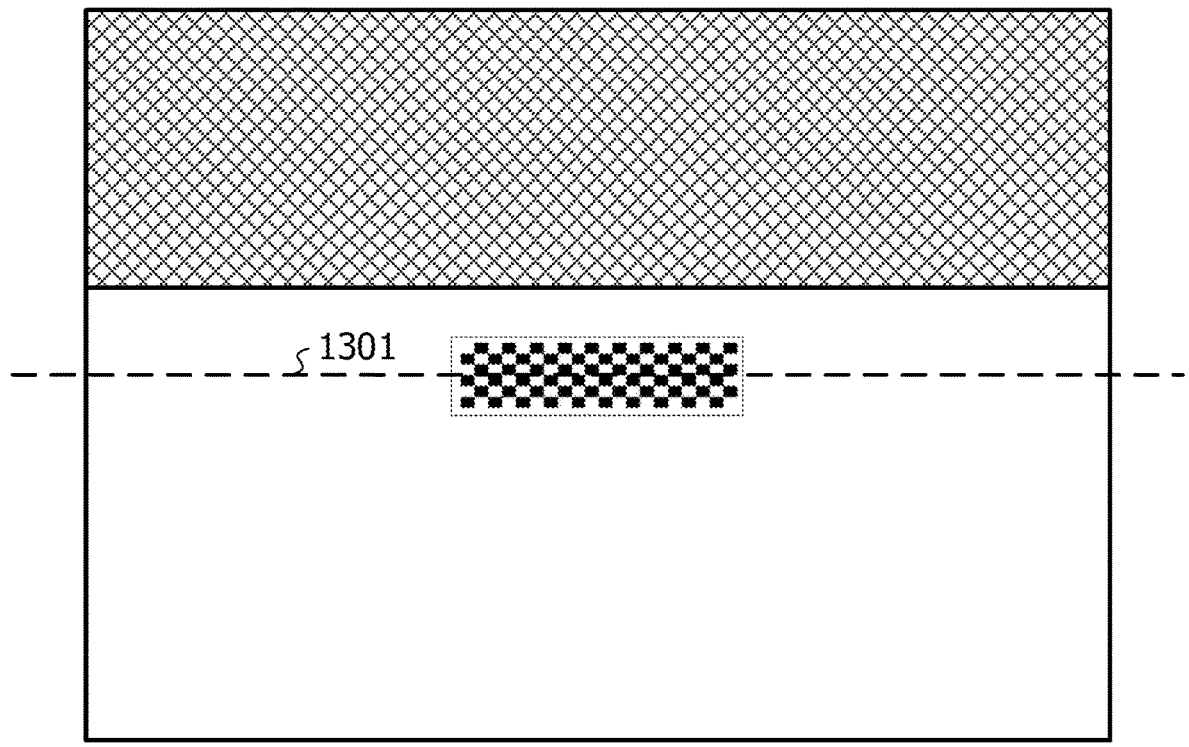
FIG. 13A illustrates an example azimuthal equidistant chart generated based on the equator setting described with reference to FIG. 12.
Figure 13B:
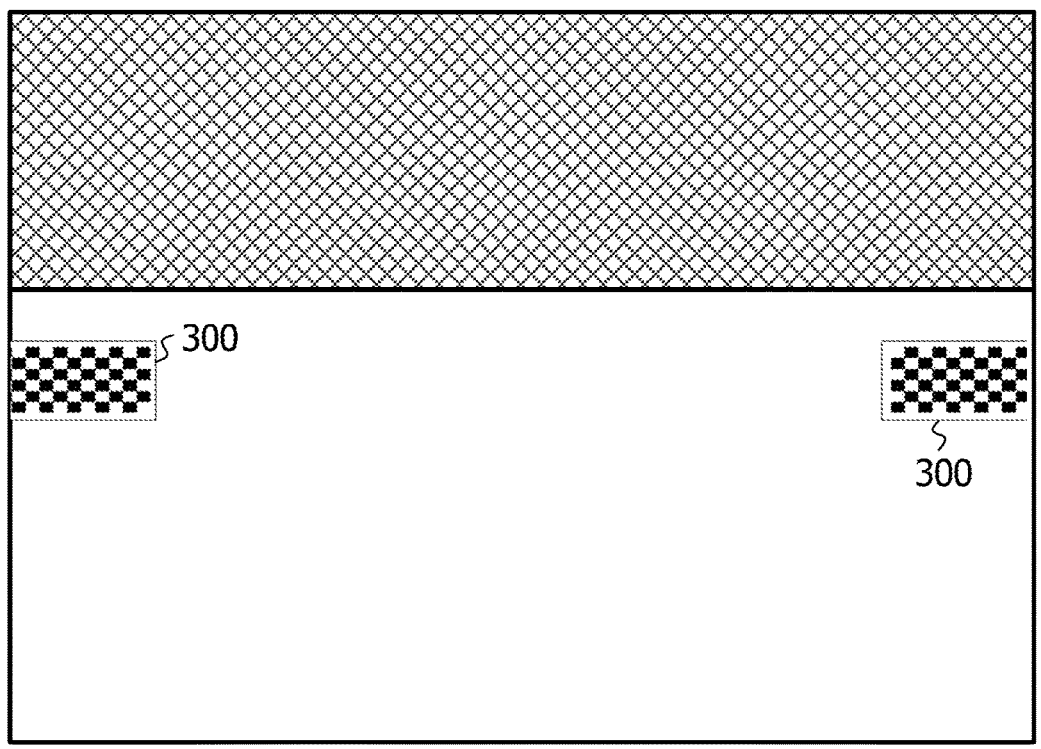
FIG. 13B illustrates an example in which when an azimuthal equidistant chart is generated, the flat plate is divided on an image.

FIG. 13A is an example azimuthal equidistant chart generated based on the equator setting described with reference to FIG. 12. Also, in FIG. 13A, it is seen that in the vicinity of an equator 1301, the distortion of the flat plate 300 in the image is lower than the distortion in FIG. 12. Similarly to FIG. 10, the shaded area in FIG. 13A is an area that is outside the field of view of the image of FIG. 12 and is not captured in the image of FIG. 12. In this case, for instance, a line 1202 of FIG. 12 may be a line (0 degree longitude line, for instance when both ends of the image in the azimuthal equidistant chart are 180 degrees east longitude and west longitude) corresponding to the longitude of the center of the image in the azimuthal equidistant chart. Thus, when an azimuthal equidistant chart is generated, it is possible to avoid division, as in FIG. 13B, of the image of the flat plate 300. As an example, a line corresponding to the longitude of the center of the image in the azimuthal equidistant chart is indicated by the line 1202 in FIG. 12, and the equator 1301 in FIG. 13A. Also in these modifications, in a range where the purpose of the correction processing is achieved, a line corresponding to the longitude of the center of the equator or the image in the azimuthal equidistant chart does not have to pass through the center the of flat plate 300.

[Example of Hardware Configuration]

Figure 14:
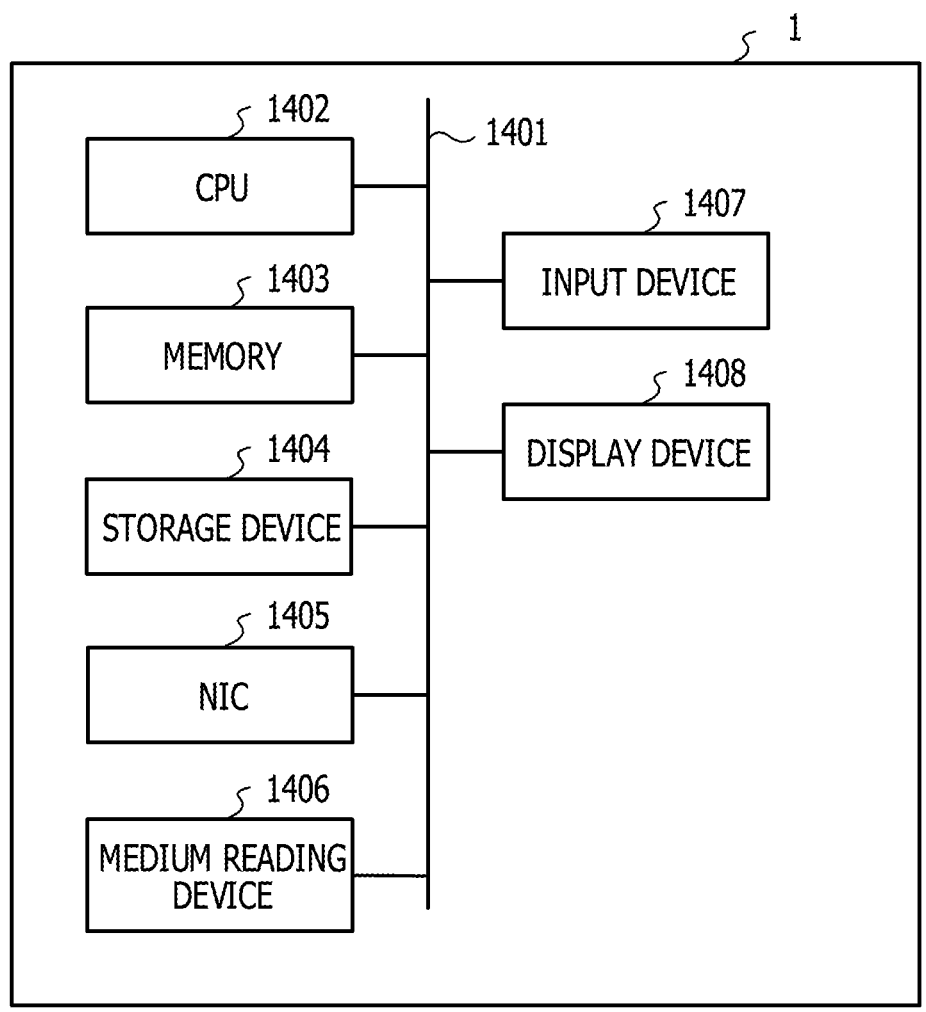
FIG. 14 illustrates an example hardware configuration of the information processing device in this example.

FIG. 14 is an example hardware configuration of the information processing device 1 in this example.

The information processing device 1 is a computer including, for instance, a central processing unit (CPU) 1402, a memory 1403, a storage device 1404, an NIC 1405, a medium reading device 1406, an input device 1407, and a display device 1408 which are coupled to each other via a bus 1401.

The CPU 1402 performs control of various operations in the information processing device 1. The memory 1403 and the storage device 1404 store programs that executes various types of processing described in this example, and various types of data utilized for the various types of processing. The storage devices 1404 is, for instance, a memory medium such as a hard disk drive (HDD) or a solid state drive (SSD).

The CPU 1402 may implement each functional unit included in the processing unit 110 illustrated in FIG. 2 by reading a program stored in the memory 1403 or the storage device 1404, and executing processing and control. Alternatively, each of the memory 1403 and the storage device 1404 may serve as the storage unit 120 illustrated in FIG. 2. It is to be noted that the CPU 1402 may be replaced by a hardware circuit such as a micro processing unit (MPU), or an application specific integrated circuit (ASIC).

The NIC 1405 is hardware used for transmitting and receiving data via a wired or wireless network. The NIC 1405 may serve as the communication unit 101 under control of the CPU 1402.

The medium reading device 1406 is a device for reading data from a recording medium, for instance, a disk drive which reads data stored in disc media such as a CD-ROM and a DVD-ROM, or a card slot which reads data stored in a memory card. Part or all of the data stored in the above-mentioned storage device 1404 may be stored in a recording medium which is readable using the medium reading device 1406.

The input device 1407 is a device that receives input and designation from users (including a system administrator). As an example of the input device 1407, for instance, a keyboard, a mouse, and a touchpad may be mentioned. The display device 1408 displays various pieces of information under the control of the CPU 1402. The display device 1408 is, for instance, a liquid crystal display.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A camera control method executed by a computer, the camera control method comprising:
   performing first detection processing that detects a plurality of predetermined patterns from one or more images captured by a first camera;
   acquiring camera characteristic information on the first camera based on one or more first predetermined patterns, included in the plurality of predetermined patterns, successfully detected in the first detection processing;
   correcting the one or plurality of images based on the acquired camera characteristic information;
   performing second detection processing to detect one or more second predetermined patterns, included in the plurality of predetermined patterns, that failed to be detected in the first detection processing, the one or more second predetermined patterns being included in the one or more images on which the correcting has been performed; and
   updating the camera characteristic information based on the detected one or more second predetermined patterns, wherein
   the correcting corrects distortion of at least one of the one or more images based on the acquired camera characteristic information,
   the first camera is a camera on which a fisheye lens is mounted, and
   the correcting includes generating an azimuthal equidistant image corresponding to one of the one or more images captured by using the fisheye lens, based on the acquired camera characteristic information.

2. The camera control method according to claim 1, wherein
   one of the one or more images is an image including an object having a predetermined characteristic; wherein
   the camera control method further comprises:
      identifying a line on the one of the one or more images, the line passing through the object in one of the one or more images; and wherein
   the correcting generates the azimuthal equidistant image in which the identified line is an equator.

3. The camera control method according to claim 2, wherein the camera control method further comprises:
   performing third detection processing that detects the plurality of predetermined image patterns from one or more second images captured by a second camera synchronizing with the first camera;
   acquiring second camera characteristic information on the second camera based on the one or more first predetermined patterns successfully detected in the third detection processing;
   correcting the one or more second images based on the acquired camera characteristic information on the second camera;
   performing fourth detection processing to detect one or a plurality of second predetermined patterns, included in the plurality of predetermined patterns, failed to be detected in the third detection processing, the one or plurality of second predetermined patterns being included in the one or more second images on which the correcting has been performed;
   updating the camera characteristic information on the second camera based on the detected one or plurality of second predetermined patterns; and
   calculating a difference between an external parameter included in the camera characteristic information on the first camera, and an external parameter included in the camera characteristic information on the second camera.

4. The camera control method according to claim 3, wherein the camera control method further comprises:
   correcting one of the one or more second images captured by the second camera based on the camera characteristic information on the first camera when model types and model numbers of the first camera and the second camera match.

5. The camera control method according to claim 1, further comprising:
   acquiring a positional relationship between the first camera and objects corresponding to the one or more first predetermined patterns in the real space; and
   updating the camera characteristic information based on positions of the one or more second predetermined patterns in the one or more images, and a positional relationship between the first camera and objects corresponding to the one or more second predetermined patterns in the real space.

6. The camera control method according to claim 1, wherein
   the camera characteristic information includes an external parameter of the first camera.

7. The camera control method according to claim 6, wherein the external parameters includes at least one of a position and an arrangement of the first camera in the real space.

8. The camera control method according to claim 1, wherein the first detection processing includes:
   detecting a plurality of first feature points on the plurality of predetermined patterns; and
   determining the one or more first predetermined patterns are successfully detected when the detected number of the plurality of first feature points is greater than or equal to a specified value.

9. The camera control method according to claim 8, wherein the second detection processing includes:
   detecting a plurality of second feature points on the corrected one or the plurality of images; and
   determining the one or more second predetermined patterns are successfully detected when the detected number of the plurality of second feature points is greater than or equal to a specified value.

10. The camera control method according to claim 1, further comprising:
    capturing one or more second images with the first camera based on the updated camera characteristics, accuracy of the second one or more images being greater than accuracy of the one or more images captured by the first camera before the correcting.

11. The camera control method according to claim 1, wherein
    the camera characteristic information includes an internal parameter of the first camera.

12. The camera control method according to claim 11, wherein
    the internal parameter of the first camera includes at least one of a parameter related to a conversion of coordinates in the real space and the coordinates of the one or more images captured by the first camera, a parameter that indicates a focal length of the first camera, a deviation of an image center and a distortion of a lens of the first camera.

13. A non-transitory computer-readable storage medium storing a program that causes a computer to execute a process, the process comprising:
  performing first detection processing that detects a plurality of predetermined patterns from one or more images captured by a first camera;
  acquiring camera characteristic information on the first camera based on one or more first predetermined patterns, included in the plurality of predetermined patterns, successfully detected in the first detection processing;
  correcting the one or plurality of images based on the acquired camera characteristic information;
  performing second detection processing to detect one or more second predetermined patterns, included in the plurality of predetermined patterns, that failed to be detected in the first detection processing, the one or more second predetermined patterns being included in the one or more images on which the correcting has been performed; and
  updating the camera characteristic information based on the detected one or more second predetermined patterns, wherein
  the correcting corrects distortion of at least one of the one or more images based on the acquired camera characteristic information,
  the first camera is a camera on which a fisheye lens is mounted, and
  the correcting includes generating an azimuthal equidistant image corresponding to one of the one or more images captured by using the fisheye lens, based on the acquired camera characteristic information.

14. A camera control device comprising:
  a memory; and
  a processor coupled to the memory and the processor configured to execute a process, the process including:
    obtaining a plurality of images of a real space within which at least one predetermined pattern is arranged;
    first detecting feature points of the at least one predetermined image pattern within the plurality of images;
    determining a feature pattern is successfully detected within an image when a number of feature points from the first detecting are equal to or greater than a specified value;
    determining the feature pattern fails to be detected within the image when the number of feature points from the first detecting are less than the specified value;
    acquiring camera characteristic information based on images in which the feature pattern is successfully detected;
    correcting the plurality of images based on the acquired camera characteristic information;
    second detecting feature points of the at least one predetermined pattern within the corrected plurality of images;
    determining a feature pattern is successfully detected within a corrected image of the corrected plurality of images when the number of feature points from the second detecting is equal to or greater than the specified value;
    updating the camera characteristic information based on images in which the feature pattern is successfully detected within the corrected plurality of images; and
    calibrating a camera based on the updated camera characteristic information, wherein
    a number of the corrected plurality of images in which the feature pattern is successfully detected is greater than a number of the images in which the feature pattern is successfully detected.

* * * * *